United States Patent [19]
Paver

[11] Patent Number: 6,044,453
[45] Date of Patent: Mar. 28, 2000

[54] USER PROGRAMMABLE CIRCUIT AND METHOD FOR DATA PROCESSING APPARATUS USING A SELF-TIMED ASYNCHRONOUS CONTROL STRUCTURE

[75] Inventor: Nigel C. Paver, Manchester, United Kingdom

[73] Assignees: LG Semicon Co., Ltd., Cheongju, Rep. of Korea; Cogency Technology Incorporated, Toronto, Canada

[21] Appl. No.: 08/941,573

[22] Filed: Sep. 30, 1997

Related U.S. Application Data

[63] Continuation-in-part of application No. 08/933,956, Sep. 18, 1997.

[51] Int. Cl.[7] .................................................. G06F 9/38
[52] U.S. Cl. ..................... 712/201; 712/201; 712/206; 712/213; 712/3
[58] Field of Search ................... 395/800.32, 382, 395/388, 384, 391; 712/800.3, 3, 201, 206, 213

[56] References Cited

U.S. PATENT DOCUMENTS

| | | | |
|---|---|---|---|
| 4,837,740 | 6/1989 | Sutherland | 364/900 |
| 5,367,638 | 11/1994 | Niessen et al. | 395/250 |
| 5,579,526 | 11/1996 | Watt | 395/800 |
| 5,627,982 | 5/1997 | Hirata et al. | 395/382 |
| 5,848,255 | 12/1998 | Kondo | 395/388 |
| 5,848,289 | 12/1998 | Studor et al. | 395/800.32 |
| 5,864,689 | 1/1999 | Tran | 395/384 |
| 5,870,578 | 2/1999 | Mahalingaiah et al. | 395/391 |

OTHER PUBLICATIONS

"A Fully Asynchronous Digital Signal Processor Using Self-Timed Circuits", Gordon M. Jacobs et al., IEEE Journal of Solid-State Circuits, vol. 25, No. 6, pp. 1526–1537.

Primary Examiner—Meng-Ai T. An
Assistant Examiner—John L. Ciccozzi
Attorney, Agent, or Firm—Fleshner & Kim

[57] ABSTRACT

A programmable circuit and method for a data processing apparatus is provided that allows an entire instruction or instruction set to be modified. According to the present invention, the instruction can be modified, for example, during initialization or execution. The programmable circuit for a data processing apparatus can include a plurality of functional units, each functional unit performing a set of prescribed operations. A programmable circuit that is capable of modifying an entire instruction. A controller that decodes a current instruction to perform a corresponding instruction task using the plurality of functional units and a communications device coupling the functional units, the programmable circuit and the controller.

28 Claims, 11 Drawing Sheets

USER PROGRAMMABLE CIRCUIT AND METHOD FOR DATA PROCESSING APPARATUS USING A SELF-TIMED ASYNCHRONOUS CONTROL STRUCTURE

This is a continuation-in-part application of U.S. application Ser. No. 08/933,956, filed Sep. 18, 1997.

BACKGROUND OF THE INVENTION

1. Field of the Invention

The present invention relates to data processing systems, and in particular, to a real-timed user defined instruction set and method for a digital processor.

2. Background of the Related Art

A processor such as a microprocessor, micro controller or a digital signal processor (DSP) processor includes of a plurality of functional units, each with a specific task, coupled with a set of binary encoded instructions that define operations on the functional units within the processor architecture. The binary encoded instructions can then be combined to form a program that performs some given task. Such programs can be executed on the processor architecture or stored in memory for subsequent execution.

To operate a given program, the functional units within the processor architecture must be synchronized to ensure correct (e.g., time, order, etc.) execution of instructions. "Synchronous" systems apply a fixed time step signal (i.e., a clock signal) to the functional units to ensure synchronized execution. Thus, in related art synchronous systems, all the functional units require a clock signal. However, not all functional units need be in operation for a given instruction type. Since the functional units can be activated even when unnecessary for a given instruction execution, synchronous systems can be inefficient.

The use of a fixed time clock signal (i.e., a clock cycle) in synchronous systems also restricts the design of the functional units. Each functional unit must be designed to perform its worst case operation within the clock cycle even though the worst case operation may be rare. Worst case operational design reduces performance of synchronous systems, especially where the typical case operation executes much faster than that of the worst case criteria. Accordingly, synchronous systems attempt to reduce the clock cycle to minimize the performance penalties caused by worst case operation criteria. Reducing the clock cycle below worst case criteria requires increasingly complex control systems or increasingly complex functional units. These more complex synchronous systems reduce efficiency in terms of area and power consumption to meet a given performance criteria such as reduced clock cycles.

Related art self-timed systems, also known as asynchronous systems, remove many problems associated with the clock signal of synchronous systems. Accordingly, in synchronous systems, performance penalties only occur in an actual (rare) worst case operation. Accordingly, asynchronous systems can be tailored for typical case performance, which can result in decreased complexity for processor implementations that achieve the performance requirements. Further, because asynchronous systems only activate functional units when required for the given instruction type, efficiency is increased. Thus, asynchronous systems can provide increased efficiency in terms of integration and power consumption.

By coupling such functional units together to form larger blocks, increasingly complex functions can be realized. FIG. 1 shows two such functional units coupled via data lines and control lines. A first functional unit 100 is a sender, which passes data. The second functional unit 102 is a receiver which receives the data.

Communication between the functional units 100, 102 is achieved by bundling data wires 104. Self-timed or asynchronous methodology uses functional units with an asynchronous interface protocol for the passing of data and control status. With two control wires. A request control wire REQ is controlled by the sender 100 and is activated when the sender 100 has placed valid data on the data wires 104. An acknowledge control wire ACK is controlled by the receiver 102 and is activated when the receiver 102 has consumed the data that was placed on the data wires 104. This asynchronous interface protocol is known as a "handshake" because the sender 100 and the receiver 102 both communicate with each other to pass the bundled data.

The asynchronous interface protocol shown in FIG. 1 can use various timing protocols for data communication. One related art protocol is based on a 4-phase control communication scheme. FIG. 2 shows a timing diagram for the 4-phase control communication scheme.

As shown in FIG. 2, the sender 100 indicates that the data on the data wires 104 is valid by generating an active request control wire REQ high. The receiver 102 can now use the data as required. When the receiver 102 no longer requires the data, it signals back to the sender 100 an active acknowledge control wire ACK high. The sender 100 can now remove the data from the communication bus such as the data wires 104 and prepare the next communication.

In the 4-phase protocol, the control lines must be returned to the initial state. Accordingly, the sender 100 deactivates the output request by returning the request control wire REQ low. On the deactivation of the request control wire REQ, the receiver 102 can deactivate the acknowledge control wire ACK low to indicate to the sender 100 that the receiver 102 is ready for more data. The sender 100 and the receiver 102 must follow this strict ordering of events to communicate in the 4-phase control communication scheme. Beneficially however, there is no upper bound on the delays between consecutive events.

A first-in first-out (FIFO) register or pipeline provides an example of self-timed systems that couple together a number of functional units. FIG. 3 shows such a self-timed FIFO structure. The functional units can be registers 300a–300c with both an input interface protocol and an output interface protocol. When empty, each of the registers 300a–300c can receive data via an input interface 302 for storage. Once data is stored in the register the input interface cannot accept more data. In this condition, the register 300a input has "stalled". The register 300a remains stalled until the register 300a is again empty. However, once the register 300a contains data, the register 300a can pass the data to the next stage (i.e., register) of the self-timed FIFO structure via an output interface 304. The registers 300a generate an output request when the data to be output is valid. Once the data has been consumed and the data is no longer required, the register 300a is then in the empty state. Accordingly, the register 300a can again receive data using the input interface protocol.

Chaining the registers 300a–300c together by coupling the output interface 304 to the input interface 302 forms the multiple stage FIFO or pipeline. Thus, an output interface request and acknowledge signals, Rout and Aout, are respectfully coupled to the following register 300a–300c (stage) input interface request and acknowledge signals, Rin and Ain. As shown in FIG. 3, data passed into a FIFO input 306 will be passed from register 300a to register 300c to eventually emerge at a FIFO output 308. Thus, data ordering is preserved as the data is sequentially passed along the FIFO. The FIFO structure shown in FIG. 3 can use the 4-phase control communication scheme shown in FIG. 2 as the input and output interface protocol.

To implement an asynchronous processor, a more complex array of functional units is required. Further, to process an instruction, the instruction must be decoded to activate the functional units required to perform the corresponding instruction task. However, to execute the instruction, the functional units may have dependencies such as data dependencies so that the functional units can not merely operate concurrently (e.g., within a clock cycle as in synchronous systems). Such dependencies enforce sequential operations on the functional unit activity to correctly execute each instruction.

An asynchronous processor is disclosed in "A Fully Asynchronous Digital Signal Processor Using Self-Timed Circuits" by Jacobs et al., IEEE Journal of Solid-State Circuits, Volume 25, Number 6, 1990 (hereafter Jacobs). However, the asynchronous processor in Jacobs merely initiates a preset activation order of all functional units regardless of the instruction. Accordingly, the asynchronous processor in Jacobs has disadvantages in that inefficiencies occur because unnecessary functional units are activated for a given instruction. Further inefficiencies occur because the ability to exploit potential concurrent operations by functional units that do not have data dependencies is lacking. In addition, Jacobs can not individually control the order and execution of the functional unit activity for each instruction to increase concurrency and efficiency.

Further, Jacobs can not implement a real time definition of instructions or a completely hardware programmable architecture.

The above references are incorporated by reference herein where appropriate for appropriate teachings of additional or alternative details, features and/or technical background.

SUMMARY OF THE INVENTION

An object of the present invention is to provide an apparatus and method for system control that obviates at least the above-described problems and disadvantages of the prior art.

Another object of the present invention is to provide an apparatus and method for user modification of a CPU instruction set in real time.

Another object of the present invention is to provide an apparatus and method for end-user customization of the ordering of instruction execution in real time.

Another object of the present invention is to provide an apparatus and method for reconfiguration of architectures such as VLSI architecture under software control.

Another object of the present invention is to provide an apparatus and method for controlling operations requiring dependencies for functional units in asynchronous systems.

Another object of the present invention is to provide a high speed asynchronous digital processor and method.

Another object of the present invention is to provide a dynamic correlation between an instruction set and a given processor architecture.

To achieve at least the above objects in whole or in part, a data processing apparatus according to the present invention includes a plurality of functional units, each functional unit performing a set of prescribed operations; a programmable circuit that modifies at least one instruction of an instruction set, wherein the modified instruction is modified real-time; a controller that decodes a current instruction to perform a corresponding instruction task using the plurality of functional units; and a communications device coupling the functional units, the programmable circuit and the controller.

To further achieve the above objects in whole or in part, a scheduler according to the present invention for use in a data processing apparatus having a plurality of functional units that each perform a set of prescribed operations includes loading decode instruction information into a programmable unit; initializing the data processing apparatus, wherein during initialization the decode instruction information from the programmable unit is copied into an internal memory; executing a current instruction from a internally loaded instruction set; and modifying an instruction from the instruction set with the decode instruction information and the programmable unit.

To further achieve the above objects in whole or in part according to the present invention, a method of operating a data processing apparatus having a plurality of functional units coupled by a data bus, wherein each of the plurality of functional units perform a set of prescribed operations, includes loading decode instruction information into a programmable unit; initializing the data processing apparatus, wherein during initialization the decode instruction information from the programmable unit is copied into an internal memory; executing a current instruction from a internally loaded instruction set; and modifying an instruction from the instruction set with the decode instruction information and the programmable unit.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

Figure 1:
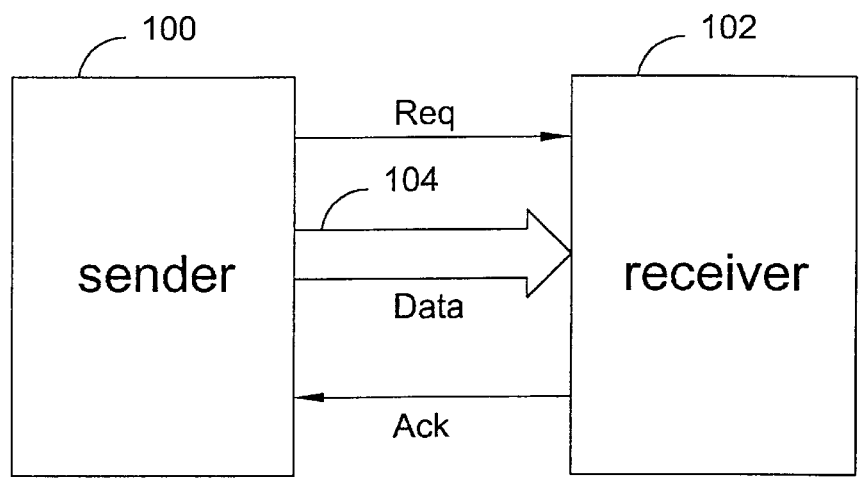
FIG. 1 is a block diagram showing a self-timed data interface.
Figure 2:
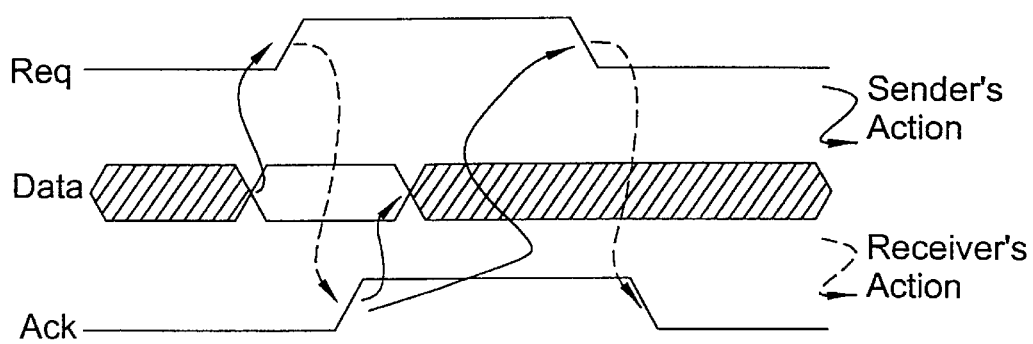
FIG. 2 is a diagram showing signal waveforms of a four-phase data interface protocol.
Figure 3:
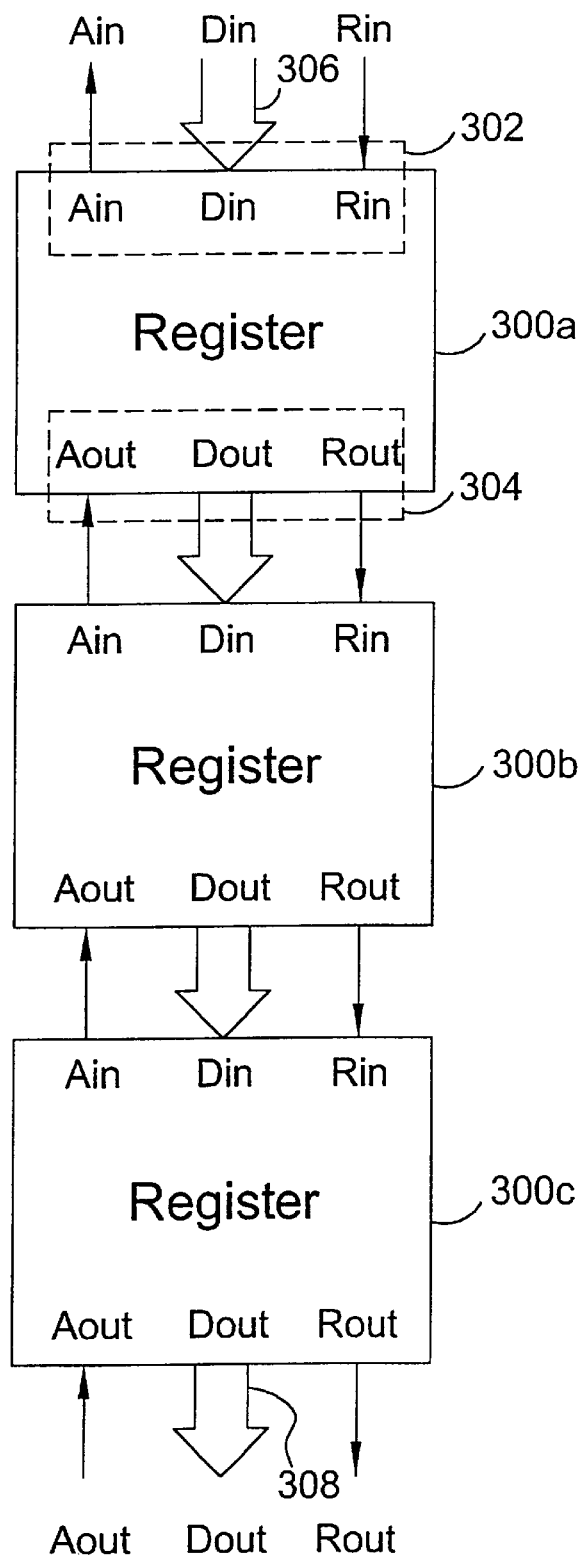
FIG. 3 is a block diagram showing a self-timed FIFO structure.
Figure 4:
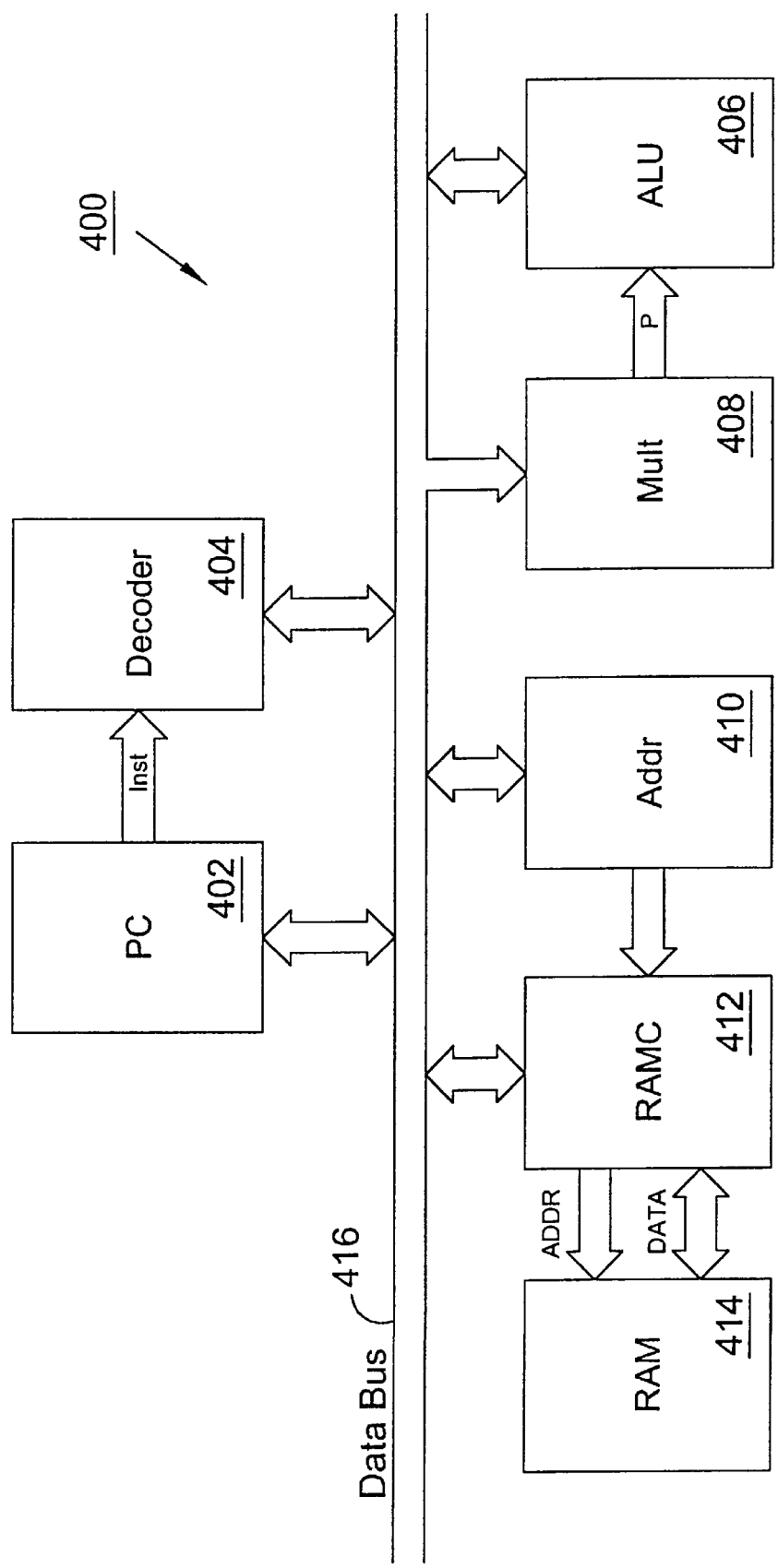
FIG. 4 is a block diagram showing a digital processor.

An exemplary processor 400 architecture is shown in FIG. 4. The processor 400 architecture includes functional units, for example, used in a microprocessor, a micro controller and DSP implementations. Each of functional units are coupled by a common resource data bus 416.

A program counter functional unit PC 402 generates an instruction program address. The PC 402 includes an address stack for holding addresses on subroutine or interrupt calls. An instruction decoder functional unit 404 controls instruction fetch and decode. The instruction decoder functional unit 404 contains an instruction decoder for generating the control of functional units and a status register for holding current process status. An arithmetic and logic functional unit ALU 406 performs data and arithmetic operations using an integer arithmetic ALU. The ALU 406 also contains a data accumulator for storing a result of a specific data or arithmetic operation.

The processor 400 further includes a multiplier functional unit MULT 408 that performs data multiplication and an indirect address register functional unit ADDR 410. The ADDR 410 holds indirect data addresses in an address register array. A Random Access Memory functional unit RAM 414 is used to store data values. A data RAM control functional unit RAMC 412 controls memory access for data memory in the RAM 414.

In the processor 400, the functional blocks can operate concurrently. However, the processor 400 must ensure correct management of the common resource data bus 416 by controlling data and sequence requirements when communications occur between functional units. Thus, the processor 400 must resolve functional unit dependencies such as data dependencies between functional units. Preferably, the architecture of the processor 400 controls communications between functional units.

Figure 5:
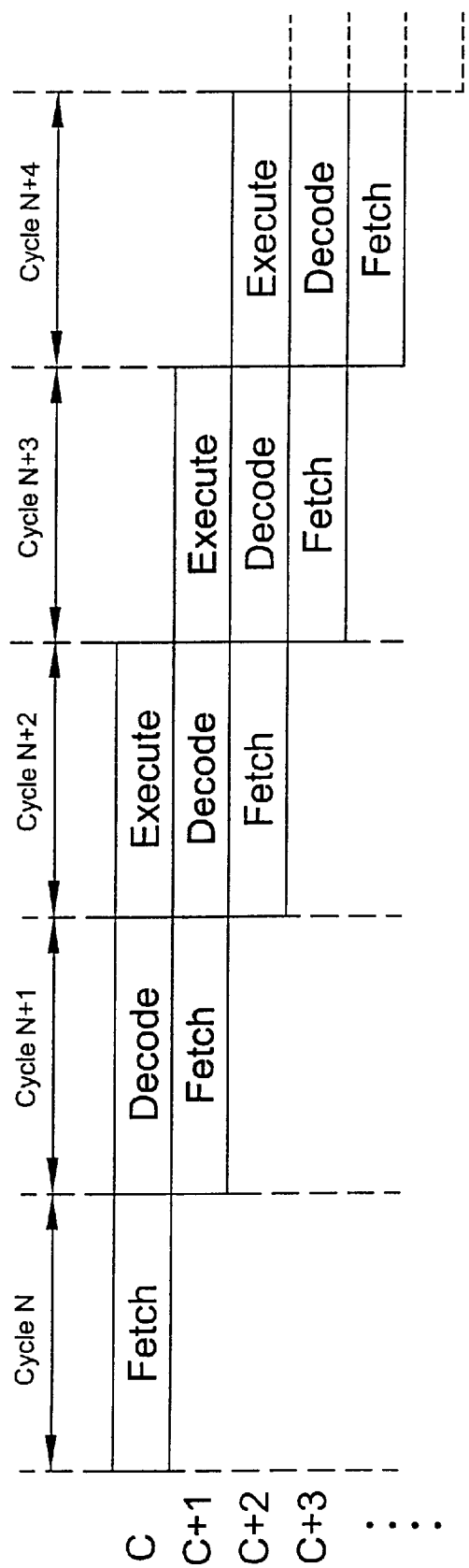
FIG. 5 is a diagram showing operations of an instruction pipeline.

The processor 400 preferably uses a 3-stage instruction pipeline composed of instruction fetch, instruction decode and instruction execute cycles. A pipelined architecture improves performance requirements by allowing more efficient (e.g., concurrent) use of the functional units of the processor architecture. As shown in FIG. 5, the 3 stage instruction pipeline allows each pipelined stage to be overlapped, which increases concurrency and processor performance.

To implement a program on a processor architecture, such as the processor 400, a set of instructions and corresponding instruction tasks must be defined. During operations, each instruction is decoded to activate the functional units required to perform the corresponding instruction task. However, to execute the corresponding instruction task for each such instruction, individual functional units may have dependencies such as data dependencies. In this case, the functional units required to be activated cannot operate concurrently but must be stalled until a particular condition (e.g., that solves the data dependency) is valid.

Figure 6:
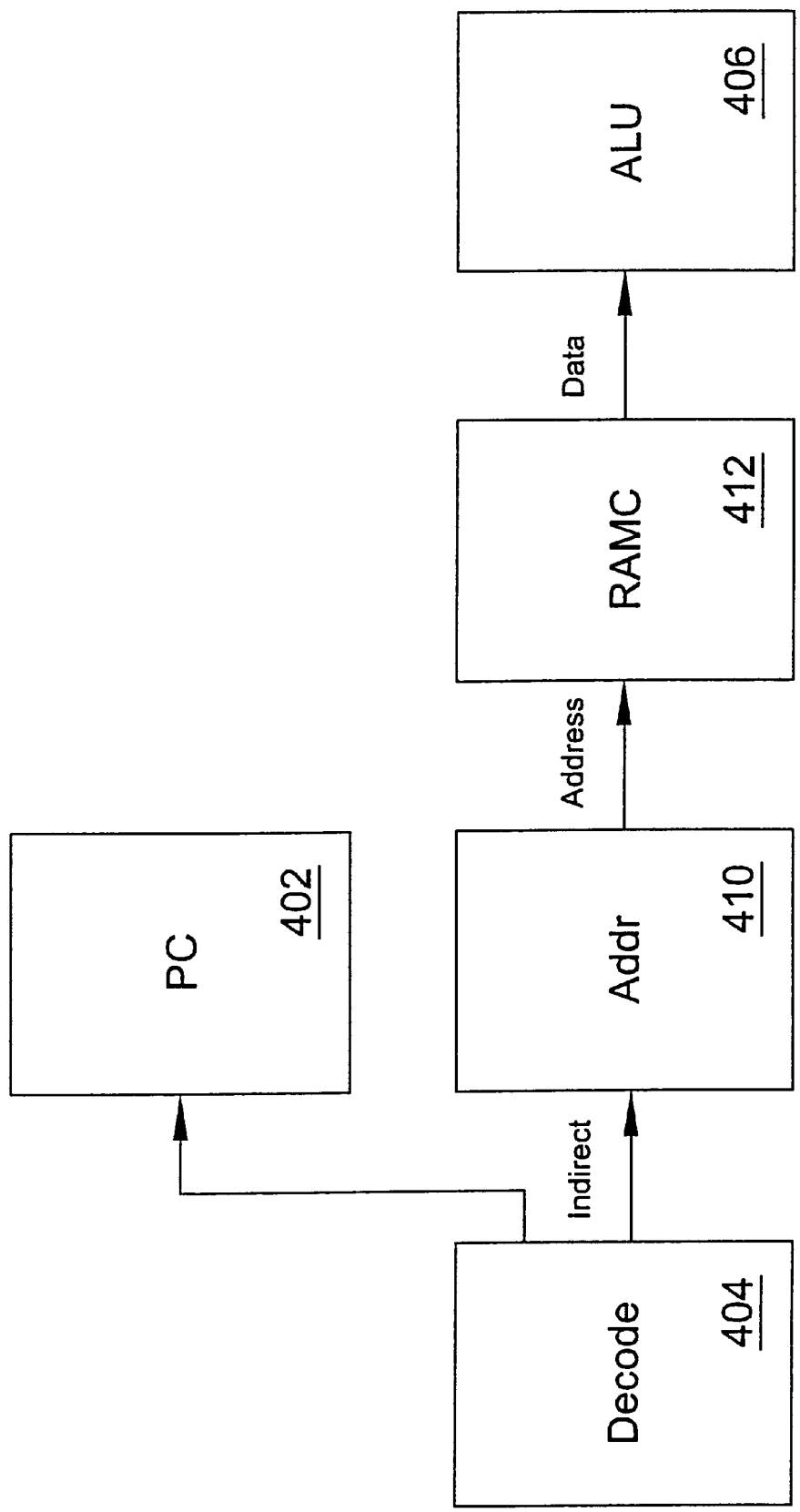
FIG. 6 is a diagram showing a functional flow of the processor of FIG. 4 for an instruction.

For example, consider an instruction "ADD*+", which is the instruction to Add Indirectly Addressed Data to the data accumulator in the ALU 406. As shown in FIG. 6, there is a dependency between functional units required by the processor 400 to perform the ADD*+ instruction. Prior to the execution of the addition within the ALU 406, the operand required by the ADD*+ instruction must be read from memory. The ALU 406 must therefore stall until the operand has been read from the RAM 414 and is valid on the data bus 416. In the processor 400, memory access is controlled by the RAMC 412. However, prior to the data read being from memory the source address of the data must be generated. For instructions using a direct mode of addressing the address pointer is usually within the instruction word. Thus, for direct mode addressing the address pointer can be passed with other decode information to the RAMC 412. However, the ADD*+ instruction uses the indirect mode of addressing. For indirect mode addressing, the address source must be generated by being read from the address register array of the ADDR 410, and the RAMC 412 must stall until the address is valid on the data bus 416.

Such dependencies illustrate sequential requirements enforced on the activity of the functional units of the processor 400 to ensure correct execution of a given instruction. Thus, FIG. 6 shows a flow diagram of activated functional units for the execution of the ADD*+ instruction by the processor 400. The PC 402 is also preferably activated by the ADD*+ instruction. The PC 402 is required by the processor 400 to generate the next instruction address and retrieve the next instruction from program memory. The concurrent operation of the PC 402 with the ADDR 410 ensures that the instruction pipeline of the processor 400 maintains a constant flow of instructions.

Figure 7:
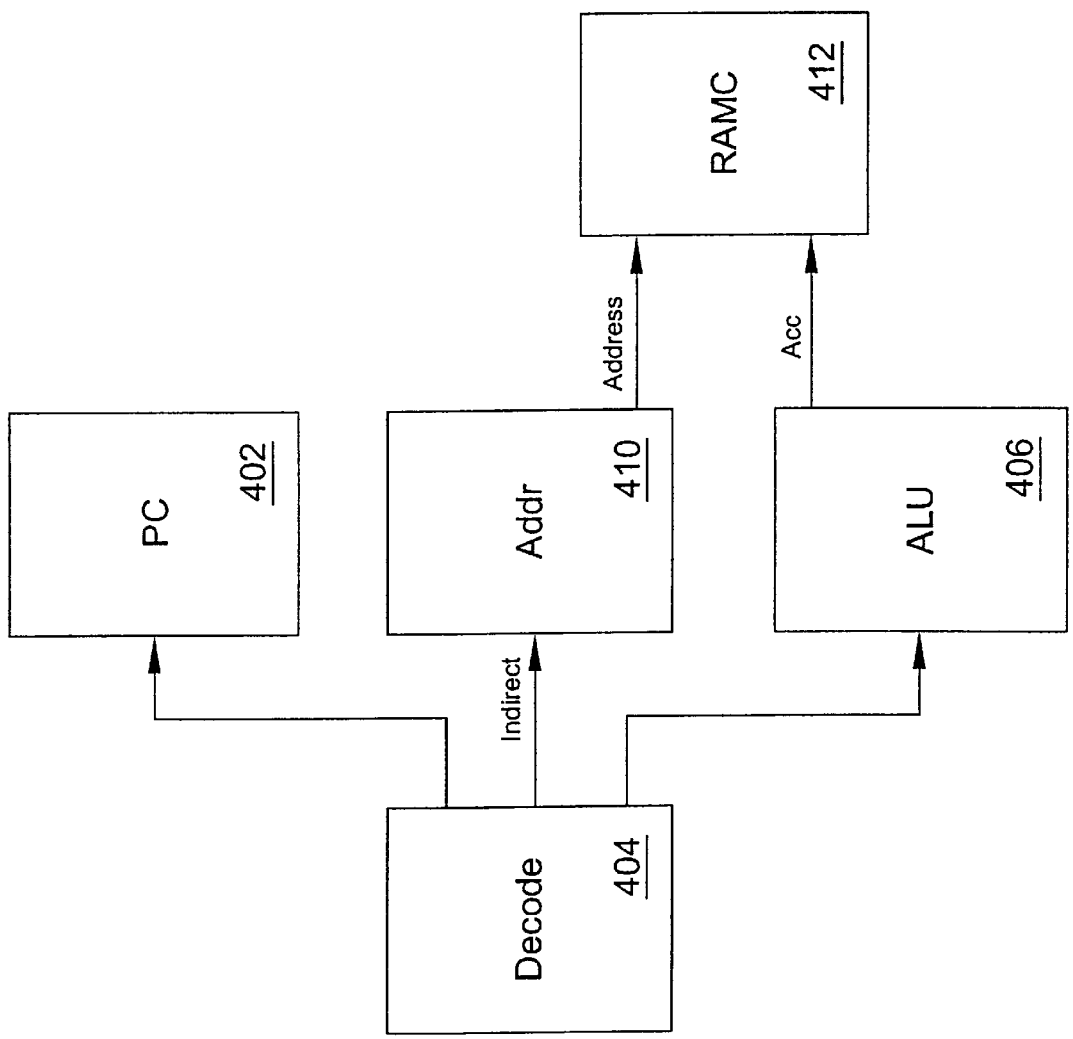
FIG. 7 is a diagram showing a functional flow of the processor of FIG. 4 for another instruction.

FIG. 7 shows a flow diagram of activated functional units in the processor 400 for another instruction, an Indirect Store Accumulator instruction "STA*+". The "STA*+" instruction stores the data accumulator to an indirectly addressed data location. For this example, prior to the activation of the RAMC 412 to store a data bus value into the data memory RAM 414, both the accumulator data must be driven onto the data bus 416 by the ALU 406 and an indirect address must be generated by the ADDR 410.

There is no interdependency between the ALU 406 and the ADDR 410 for the Indirect Store Accumulator instruction STA*+. Thus, the ALU 406 and the ADDR 410 can operate concurrently. However, the activation of the RAMC 412 is stalled until both the ALU 406 and the ADDR 410 have completed their tasks. Again, in FIG. 7, the PC 402 is shown operating in parallel with the STA*+ instruction execution because the program instruction address and fetch are required to fill the instruction pipeline.

The above-described instruction examples illustrate the complexity of management required to order and activate each functional unit within a processor to execute an instruction. Further, many instructions can be defined in an instruction set. Thus, to achieve a predetermined level of concurrancy for the functional units activated when performing an instruction set, many different flow diagrams are required. Similarly, such management control would be required for an asynchronous system using a set of functional blocks to perform defined operations.

To achieve the control required for implementing an instruction set on a processor such as the processor 400 architecture, a preferred embodiment of an apparatus and method for asynchronous system control according to the present invention will now be described. As shown in FIG.

8, a processor 800 architecture includes the preferred embodiment of a self-timed scheduler. The processor 800 includes exemplary functional units: a PC 802, an ALU 808, a MULT 808, an ADDR 810, a RAMC 812. The operations of the functional units of the processor 800 are similar to the operation of the functional units of the processor 400 described above. Accordingly, a detailed description will be omitted. However, the present invention is not intended to be so limited. Additional, fewer or alternative functional units used to implement the processor 800 based on the intended operational requirements and environment would be within the scope of the present invention.

Figure 8:
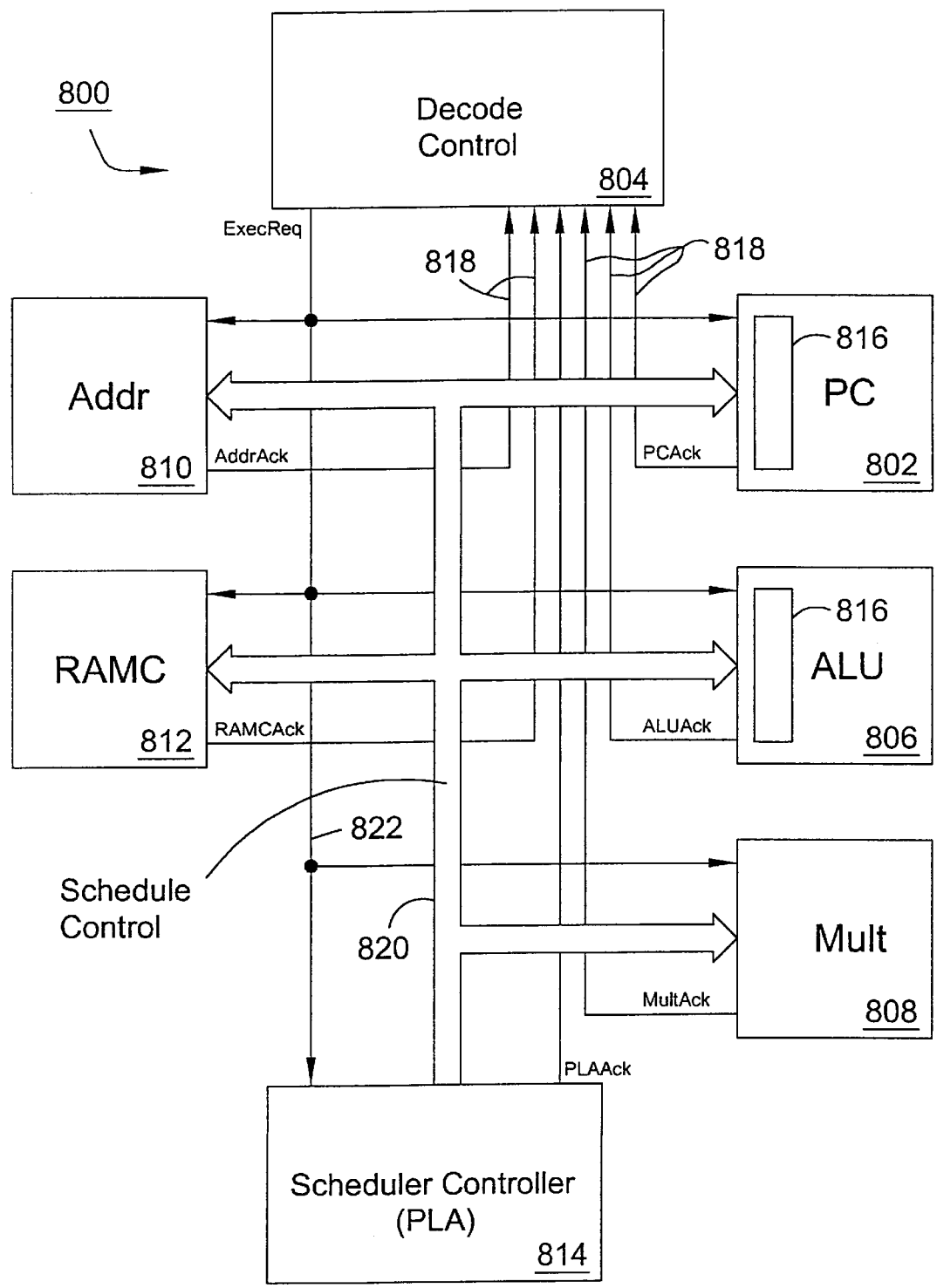
FIG. 8 is a diagram showing a preferred embodiment of a scheduler in a self-timed processor according to the present invention.

As shown in FIG. 8, a decode functional unit is split into two separate functional units including a decode instruction functional unit 804 and a scheduler controller functional unit 814. The decode instruction control 804 controls the self-timing of the instruction execution phase and contains additional functionality such as status registers. The scheduler controller 814 decodes the current instruction and also generates the relevant functional control bundles for each of the functional units. The scheduler controller 814 thus preferably incorporates similar functionality of portions of the instruction decoder 404. FIG. 8 also shows a scheduler control bus 820 that feeds the relevant schedule control data to each functional unit via a scheduler functional unit controller 816, functional unit request control lines 822 and functional unit acknowledge control lines 818.

The self-timed scheduler includes the scheduler controller 814, the scheduler control bus 820 and the self-timed scheduler functional unit controller 816 in the input protocol for each functional unit of the processor 800 and corresponding additional control bits bundled with the control data bus. The additional control bits that implement the self-timed scheduler functionality are preferably generated, along with the required functional control bits for each functional unit, within the scheduler controller unit 814. Control data bundles are preferably generated using a programmable logic array (PLA) where each instruction mnemonic is input to the PLA and the appropriate control bundles for each functional unit are generated as output.

Operations of the preferred embodiment of the self-timed scheduler will now be described. As shown in FIG. 8, for an execution cycle of each instruction in the processor 800, the decode instruction control 804 generates an active execute request signal ExecReq to all functional units. At this point, all the control data bundles from the scheduler controller 814 for each of the functional units are valid because the control data bundles were generated in the execution cycle for the previous instruction (e.g., see FIG. 6).

On receipt of the execute request signal ExecReq, each functional unit will activate based on control information in the scheduler controller 814 control data bundle transmitted via the scheduler control bus 820. The control information can preferably initiate one of three possible operations in the functional unit. The three operations include Bypass, Activate (unconditional) and Stall (conditional). However, the present invention is not intended to be so limited. For example, any set of operations that accomplish at least the following operations could be used.

In the Bypass operation, a functional unit is not required for the execution of an instruction task for the current instruction. Thus, the functional unit is bypassed. The functional unit will immediately generate a corresponding acknowledge signal (e.g., ALUAck for the ALU 806) signaling its completion. In the Activate (unconditional) operation, the functional unit begins operations as defined by the control information from the scheduler controller 814. On completion of its function, the functional unit generates the corresponding acknowledge signal. In the Stall (conditional) operation, the functional unit stalls until one or more additional functional units have completed their respective operations (e.g., a function and the corresponding acknowledge signal). For the stall (conditional) operation, the functional unit has dependencies based on the operations of other functional units. Accordingly, the functional unit must wait until the completion of the one or more functional units on which its activation is stalled.

The scheduler functional unit controller 816 for each functional unit stalls a corresponding functional unit until the data dependencies have been resolved. In other words, the scheduler functional unit controller 816 for each functional unit monitors the acknowledge signals, for example, by using the acknowledge control wires 818 of the additional functional units on which its activation is stalled. As discussed above, on completion of its function, each of the functional units activates the corresponding acknowledge control wire 818. When the scheduler functional unit controller 816 has successfully monitored the completion of all the functional units on which its activation is stalled, the functional unit can be activated, carry out its function, and acknowledge back to the decode instruction control 804 its completion.

As the processor 800 preferably uses a 4-phase control protocol, the decode instruction control 804 preferably initiates a recovery cycle when all functional units have completed their functions as signaled through the acknowledge control lines 818. The decode instruction control 804 can then prepare for the next instruction execution cycle.

However, with the 4-phase control protocol, two functional units in the processor 800 cannot be dependent on each other because a stall in this case can lead to a deadlock condition. In the deadlock condition, neither functional unit activates until the other functional unit has completed its function. However, the present invention is not intended to be limited to disallow cross-dependency caused by the 4-phase control protocol. For example, to prevent deadlock an alternative interface protocol or a priority scheme could be used to permit functional units to be dependent on each other.

The scheduler controller 814 is not a functional unit in the same sense as the ALU 806 or RAMC 812 functional units. The scheduler controller 814 decodes the instruction for the next execution phase. Therefore, the scheduler controller 814 operates in parallel with the current instruction execution cycle and outputs data that controls all the functional units. Thus, the scheduler controller 814 cannot be updated until all functional units have completed and the previously executed control data bundle is no longer required. Use of a 4-phase control protocol can be used for the self-timed scheduler operations because the decode instruction control 804 sets the ExecReq signal low upon entering the recovery phase. The low ExecReq signal indicates to the scheduler controller 814 that its preceding control data bundle is no longer required and can be updated for the next execution cycle. Accordingly, the scheduler controller 814 returns an acknowledge signal PLAAck low to indicate that the new control data bundle is now valid and the next execution cycle can be activated.

Thus, the preferred embodiment of the self-timed scheduler can dynamically define execution ordering, concurrency and sequentiality of all the functional units under its control. Further, additional instructions can be subsequently added to the instruction set, for example, by only implementing the added instruction mneumonic in the PLA to generate a control data bundle. Similarly, subsequent functional units can easily be incorporated into the processor architecture by using a protocol such as a scheduler functional unit controller.

Figure 9:
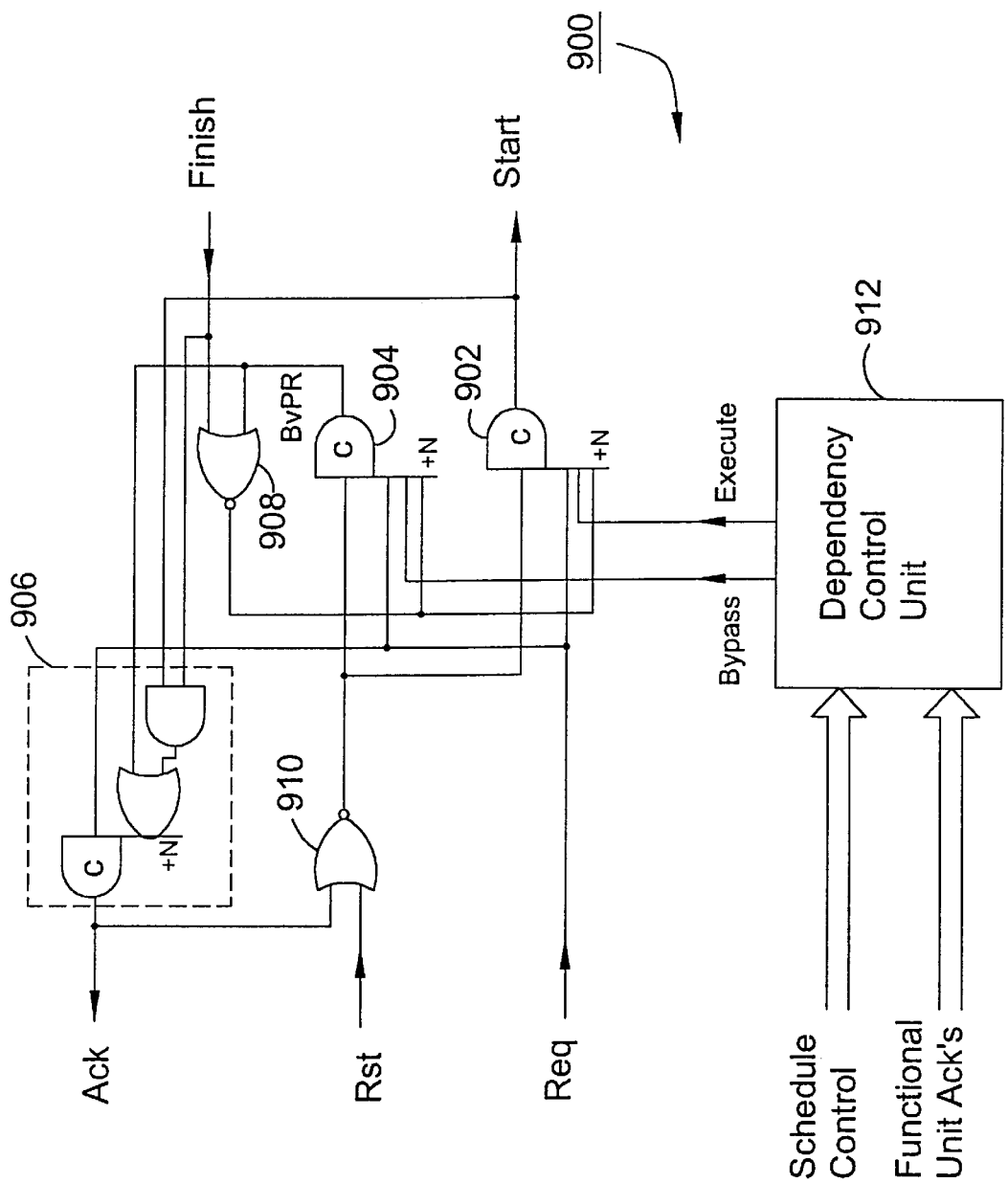
FIG. 9 is a diagram showing a preferred embodiment of a scheduler functional unit controller according to the present invention.

A preferred embodiment of a scheduler functional unit control circuit will now be described. However, the present invention is not intended to be limited to this because alternative interface protocols could be used. FIG. 9 shows a circuit diagram of such a scheduler functional unit control circuit 900 that can be used as the scheduler functional unit controller 816 in the processor 800. Accordingly, the scheduler functional unit control circuit will be described based on 4-phase control protocol.

Figure 10:
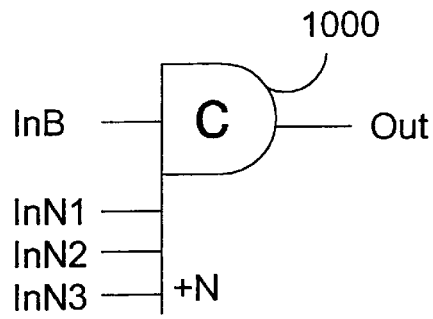
FIG. 10 is a diagram showing an asymmetric C-gate.

The scheduler functional unit control circuit 900 includes two asymmetric C-gates 902, 904, a complex 4-input C-gate 906, and two NOR gates 908, 910. C-gates can operate as an AND function for self-timed events. Many different implementations of C-gates exist, however, all perform the basic functionality that one input condition instantiates a high on the C-gate output, a different input condition instantiates a low on the C-gate output and the remaining input conditions of the C-gate input pins retain a previous set output. FIG. 10 shows an exemplary 4-input asymmetric C-gate element 100, which is a special case of the standard Muller C-gate. This form of C-gate is known as an asymmetric C-gate because all input pins effect the setting of the gate output high, however, only one input pin effects the setting of the gate output low. The Asymmetric C-gate 1000 shown in FIG. 10 has the following functionality:

IF InB AND InN1 AND InN2 AND InN3 THEN Out→High;

ELSE IF/InB THEN Out→Low;

and

ELSE no change on Out.

The asymmetric C-gate 1000 is preferably used as the C-gates 902, 904 in the scheduler functional unit controller 900.

Figure 11:
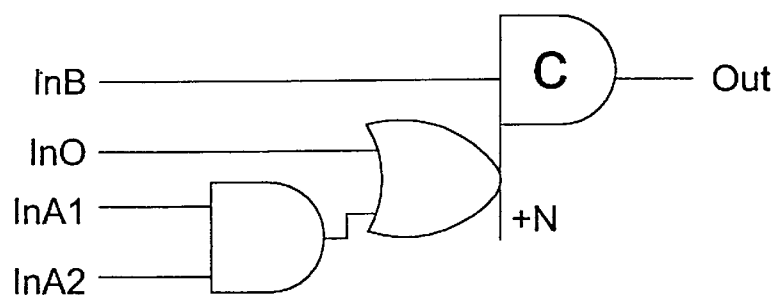
FIG. 11 is a diagram showing a complex asymmetric 4-input C-gate.

As shown in FIG. 11, the complex asymmetric C-gate 906 has the following functionality:

IF InB AND (In0 OR (InA1 AND InA2)) THEN Out→High;

ELSE IF/InB THEN Out Low;

and

ELSE no change on Out.

The scheduler functional unit control circuit 900 includes: request, acknowledge, start, finish, and reset interface signals. The request signal Req requests input (e.g., from the decode instruction control 804) to initiate functional unit activity. The acknowledge signal Ack is output on completion of the functional unit activity (e.g., bypass). The start signal Start is the functional unit internal activate signal. The finish signal Finish is the functional unit internal completion signal. The reset signal Rst is a circuit reset signal that initializes the state of control logic. As shown in FIG. 9, the reset signal Rst is set active high.

FIG. 9 also shows an additional depending control unit 912. Inputs to the dependency control unit 912 preferably include the control data bundle and the monitored functional unit acknowledge signals.

Operations of the scheduler functional unit controller 900 will now be described. After initialization, the scheduler functional unit controller 900 is activated by a positive going input request signal, Req. The request signal Req will then transitions an output of one of the two C-gates 902, 904 high dependent on the control signals, Bypass and Execute. If the Bypass signal is high then the output of C-gate 904 will transition its output high. The high output of the C-gate 904 indicates that the corresponding functional unit (not shown) will be bypassed. The C-gate 904 then activates a signal ByPR, which in turn transitions an output of the C-gate 906 high to generate the acknowledge signal, Ack. The scheduler functional unit controller 900 then must go through a recovery phase with the input request signal Req going low, which in turn resets the output acknowledge signal Acq low.

If, on an active request, the control signal Execute is high, the output of the C-gate 902 will transition high. The high output of the C-gate 902 activates the corresponding functional unit internal signal Start to initiate its activity. Completion of the corresponding functional unit activity is signaled by the internal signal Finish transitioning active high. The high internal signal Finish in turn will transition the output of the complex C-gate 906 high, which generates the output acknowledge signal Ack.

The scheduler functional unit controller 900 preferably has additional functionality that adds a safety feature to the circuit. The signals Finish and ByPR are fed through the 2-input NOR gate 908 to prevent the incorrect output signal transitions of the inactivated C-gates 902, 904. The NOR gate 908 allows the control signals, Execute and Bypass, to become undefined after an active acknowledge signal Acq has been generated. The feedback loop disables the activation (active high output signal) of either C-gates 902, 904 until both gates have returned to their initial low state, which indicates the completion of their 4-phase protocol cycle. Note that the control signals Execute and Bypass must never be both active (high) when an active high request occurs. In this case, both C-gates 902, 904 will activate causing unpredictable behavior and possibly deadlock.

Figure 12:
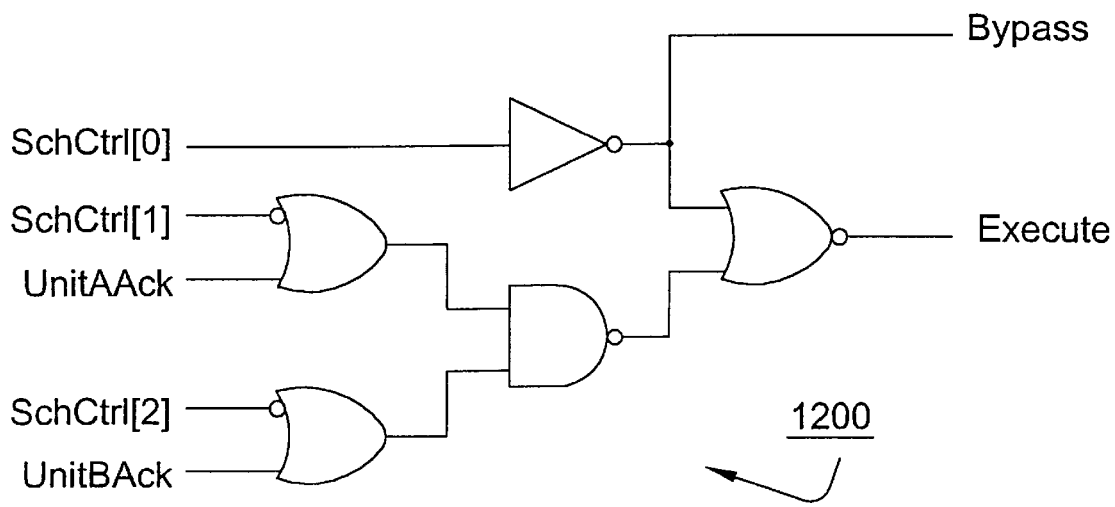
FIG. 12 is a diagram showing a preferred embodiment of a schedule control logic according to the present invention.

The control signals Bypass and Execute are preferably generated by the self-timed scheduler from the control data bundle and monitored functional unit acknowledge signals. FIG. 12 shows an exemplary control circuit 1200 example for a functional unit with dependencies on two other functional units, A and B (not shown). The control circuit 1200, for example, can be used as the dependency control unit 912 of the scheduler functional unit controller 900.

For the control circuit 1200, a 3-bit schedule control data bundle is required. The 3-bit schedule control data bundle is shown as the data bundle SchCtrl[2:0] in FIG. 12. Exemplary bit definitions of the data bundle SchCtrl[2:01] the bit signal SchCtrl[0] being high activates the corresponding functional unit. If the bit signal SchCtrl[0] is low, the corresponding functional unit is bypassed. If the bit signal SchCtrl[1] is high, wait for the functional unit A acknowledge signal, UnitAAck, high before activating the corresponding functional unit. If the SchCtrl[1] bit signal is low do not wait before activation. The SchCtrl[2] bit signal operates similar to the SchCtrl[1] except in relation to the functional unit B.

Therefore, if SchCtrl[0] is low, the Bypass signal is set high and the functional unit is not activated. Note that when the Bypass signal is set high, the Execute signal is preferably forced low to ensure that both signals do not activate at the same time. If SchCtrl[0] is high, the Bypass signal is disabled. However, the activation of the Execute signal is dependent on the remaining bits of the schedule control data bundle. If all remaining bits (e.g., SchCtrl[2:1] are low, then the functional unit has no data dependencies and the Execute signal will be set high to activate the functional unit. If remaining control bits of the scheduler control data bundle are high, then data dependencies exist and the Execute signal is remains low to stall activation of the functional unit. If the control bits SchCtrl[0] and SchCtrl[1] are both high, the Execute signal will stay low until the UnitAAck signal goes high, with the resolution of the dependency in functional unit A allowing the stalled functional unit to proceed. If more than one bit of the control data bundle is set (e.g., SchCtrl[1] and SchCtrl[2] both high), the Execute signal will remain low until each selected dependency is resolved.

Although the control circuit 1200 monitors two functional units, A and B, the present invention is not intended to be so limited. Accordingly, the self-timed scheduler can monitor one, three or more dependencies. However, a predetermined amount of setup time is required to guarantee that the Bypass and Execute signals are in a valid state before the active high request signal Req is input to the schedule control circuit 1200.

As shown in FIG. 8, a decode functional unit is split into two separate functional units including the decode instruction functional unit 804 and the scheduler controller functional unit 814. However, the function and implementation of decoding instructions and generating the relevant functional control bundles for each of the functional units can be implemented as a user programmable structure. Thus, for example, the scheduler controller functional unit 814 or portions of the instruction decoder 404 can be implemented as the user programmable structure.

For example, an instruction set can be specified by the decode information. Thus, with a user programmable structure, the decode information can be modified by using a programmable structure to implement the decode information that maps between an instruction (e.g., an instruction bit pattern) and a set of functional blocks to be activated. End users can specify a predefined instruction set and any additional instructions desired or an end-user defined instruction set (as long as the desired instructions can be mapped onto the hardware). In this case, the end-user is considered to be someone other than the manufacturer. Further, the same hardware (e.g., digital processor, chip, or the like) can support multiple, differing instruction sets, which can be changed by simply reloading the user programmable structure.

Figure 13:
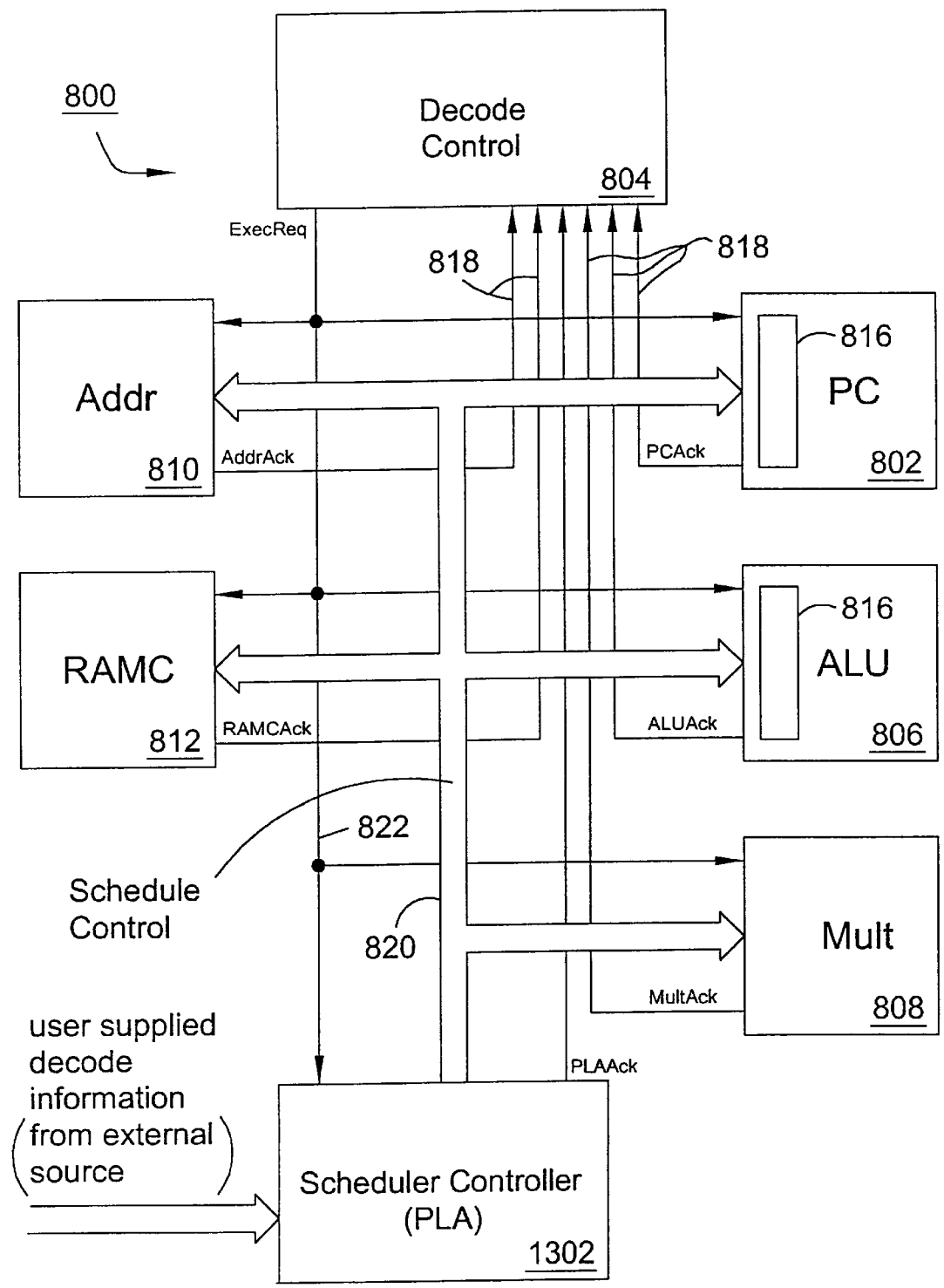
FIG. 13 is a diagram a preferred embodiment of a programmable structure for a decode functional unit.

A preferred embodiment of a user programmable structure for a decode functional unit according to the present invention will now be described. As shown in FIG. 13, the digital processor 800 includes a user programmable scheduler controller 1302. The self-timed processor 800 was described above, and accordingly, a detailed description is omitted.

The user programmable scheduler controller 1302 can be implemented using registers, RAM, ROM, a combination of registers, RAM and ROM, or the like. Using RAM or registers allows the user programmable scheduler controller 1302 to load the decode information from an external source as shown in FIG. 13. As described above, the decode information specifies which functional units are activated and sequences the activated functional units in the desired order for each instruction to be executed. Therefore, the user programmable scheduler controller 1302 in the self-timed digital processor implements an architecture that is completely programmable after manufacture, as long as the functional units necessary to perform the intended operation exist in the digital processor.

A ROM based implementation of the user programmable scheduler controller 1302 implements the hardware or hard-wired function of the decode information, which includes at least a decode table, into fixed software or ROM. As discussed above, the decode table translates the instruction mnemonic into the functional unit schedule and control information. In the ROM implementation, the decode table would be fixed upon encoding into the ROM. Alternatively, limited modification could be incorporated using flash ROM technology, EEPROM or the like.

A RAM based implementation of the user programmable scheduler controller 1302 existing in an external source can be boot loaded during initialization of the processor 800 to copy the decode table into internal memory. The copied instruction set could then be used by the signal processor, main processor or the like of the digital processor 800. The external RAM source can be an external memory, internal memory or another source of programmable memory on a chip that includes the processor 800. Further, the external RAM can include multiple various predetermined instruction sets. In this case, one of the multiple instruction sets could be selected by a user during or before initialization. Alternatively, one of the multiple instruction sets can be selected based on existing or detected conditions. For example, the selected one of the instruction sets could be selected based on a setting of external pins. In particular, upon error detection, a specific set of error correction instructions could be loaded. Further, the selected instruction set could be loaded either before initialization, during initialization or during subsequent operations.

Generally, for ROM and RAM based implementations, the instruction set is loaded sequentially into memory. Then, address bits in the instruction or the instruction mnemonic are used to access the desired memory location. Accordingly, as the instruction set increases in size, more bits are required in the instruction and more addresses in memory. For example, an 8 bit instruction can represent up to 256 separate instructions and needs $2^8$ or 256 memory locations. Similarly, a 16 bit instruction needs $2^{16}$ or 65536 memory locations.

A register based implementation of the user programmable scheduler controller 1302 generally uses an array of registers. The register based implementation uses the register array to implement decode table or a look-up table representation of the functional unit schedule and control information. Beneficially, the register based implementation allows more flexibility because the instructions are not translated into sequential locations in memory. Thus, a sparsely populated memory can be represented.

The user programmable scheduler controller 1302 has been described as various implementations of ROM, RAM or registers. However, the present invention is not intended to be limited to this. For example, any user programmable structure can be used for the user programmable scheduler controller 1302.

Figure 14:
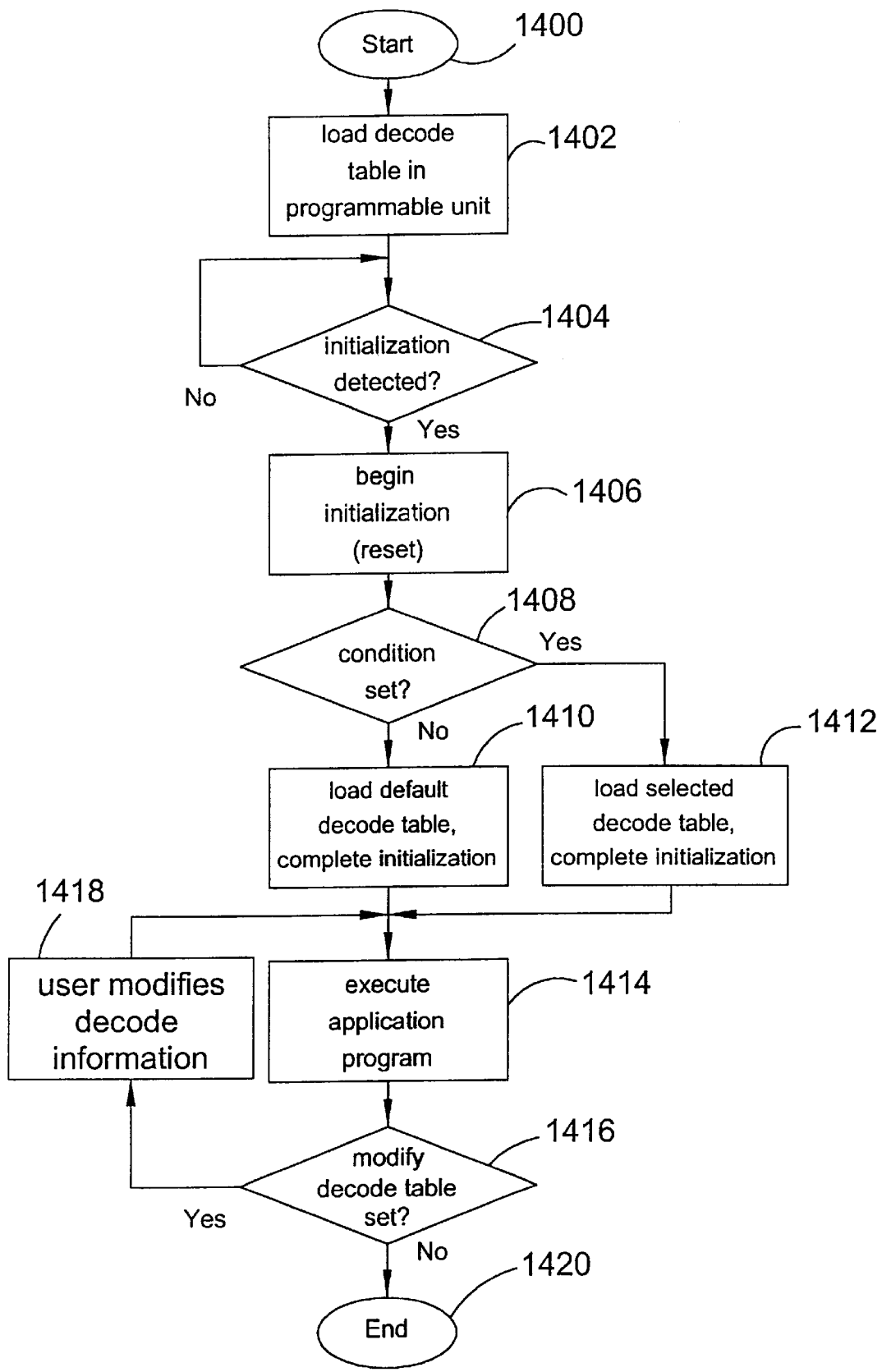
FIG. 14 is a diagram showing a flowchart of operations of the programmable decode functional unit of FIG. 13.

Operations of the user programmable scheduler controller 1302 will now be described with respect to FIG. 14. As shown in 14, the process starts in step 1400 where control continues to step 1402.

In step 1402, the decode table is loaded in a programmable unit (e.g., ROM, RAM, registers or the like) such as the user programmable scheduler controller 1302. In step 1402, multiple varying versions of the decode table can be loaded. The decode table can be loaded one instruction at a time or in blocks of multiple instructions. From step 1402, control continues to step 1404. In step 1404, a check is made for initialization. If the determination in step 1404 is affirmative, control continues to step 1406. Alternatively, if initialization is not detected, control returns to step 1404.

In step 1406, initialization begins. From step 1406, control continues to step 1408. In step 1408, a check is made for a decode condition. If the decode condition is not set in step 1408, control continues to step 1410. In step 1410, a default decode table is loaded from the programmable unit and initialization is completed. However, if a decode condition is set in step 1408, control continues to step 1412. In step 1412, a selected decode table is loaded from the programmable unit and initialization is completed. For example, the initialization can take the form of compiling the source code of a main processor of a data processing apparatus. In the self-timed processor 800, the functional unit schedule and control information represented in the decode table configures the processor architecture. For example, if an error decode condition is detected in step 1408, an error instruction set could be loaded from the programmable unit into the decode table. Such an error instruction set can be used to identify, track and correct a detected error in the digital processor, its peripheral units or in an executing application program. From steps 1410 and 1412, control continues to step 1414.

In step 1414, the main processor executes instructions based on the instruction set implemented by the user programmable decode information to run an application program. From step 1414, control continues to step 1416. In step 1416, a check is made to determine if the user wants to modify the decode information during execution. If the determination in step 1416 is affirmative, control continues to step 1418 where the user modifies the decode table using the programmable unit (e.g., RAM or register). Thus, in step 1418, the decode table is modified real time, for example, without recompiling the processor or application code. From step 1418, control returns to step 1416. If the determination in step 1416 is negative, control continues to step 1420. In step 1420, the process is completed.

To ease the process of loading new instruction decode information, a default set of universal instructions could be defined and hard wired within the decode information of the programmable unit (e.g., programmable memory such as ROM). Preferably, the hard wired instructions include instruction types such as initialization instructions (e.g., "Load", "Transfer" or the like) to enable easy access to the decode table in the programmable unit. Such instructions are also known as "house-keeping" instructions and are usually always valid on the processor. In contrast, instructions that are valid for only one operating mode of the processor (e.g., error instructions) can be delegated to only one of multiple instruction sets.

To keep the size of the decode programmable memory to a minimum, the allowable input bit patterns can be limited to support a predetermined set of instructions in one operating mode. Thus, the instruction set could be limited to 256 different instructions per instruction set. Also for efficiency reasons, the position of any fields in the instruction bit pattern are fixed. Fixed fields can reduce cost and simplify the logic required for encoding and decoding. Thus, the instruction bit pattern can be defined as the least significant 7 bits of the instruction word.

Further, based on the user programmable scheduler controller 1302, decode table "program" macros, which can manipulate program particular hardware configurations for differing functions, can be implemented. The program macros could be updated within the user programmable scheduler control 1302 in real-time under software control. Thus, the user programmable structure permits multiple levels of flexibility to the end-user. Further, the user programmable structure permits different time points of flexibility in the development of the corresponding hardware (e.g., a digital processor).

As described above, the user programmable scheduler control 1302 can be used to generate universal architecture with various multiple functional units using instruction bits, external control pins or a user programmable register or memory, to provide the scheduler control. Such an implementation allows a multi-threaded compiler for the processor 800 to generate instructions that would run on a user definable parallel architecture. Alternatively, the use of such a scheduler would allow the construction of hardware programmable chips whose functionality could be altered by changing scheduler control bits within a register, memory or on external pins to reorder the execution of data among functional units. The preferred embodiment of the user programmable scheduler controller 1302 and method for using same in a self-timed data processing apparatus supports a completely hardware programmable architecture. Thus, the user programmable structure is not intended to be limited to the processor 800.

Supporting such an architecture within a synchronous environment requires an increase in complexity. The concepts of scheduling within a synchronous paradigm is more complex because of the further requirement of referencing to phases of a clock signal or clock cycle. As discussed above, the clock also forces a more rigid design environment for the functional units and must be tailored to handle the worst case operating case of the programmable architecture.

Although the scheduler has been described in reference to a particular design, the concept is applicable to the control of general self-timed circuits with intercommunicating sub-blocks and not just processor architectures as has been so far described. Further, the self-timed scheduler was implemented in a self-timed DSP design using a 4-phase control scheme. However, alternative self-timed interface protocols other than the 4-phase control scheme can be used.

The preferred embodiments of the present invention allows for user programmable circuit control. A software designer using a hardware architecture implementing the user programmable circuit control can define new ordering of operations to optimize a generic hardware for a specified application or software application program. Beneficially, software for embedded systems can tailor an architecture for a given application to reduce system cost or improving performance without requiring new custom hardware.

As described above, the preferred embodiments of the apparatus and method to control asynchronous systems according to the present invention can be configured to implement any instruction type onto the functional units provided, which enables functional unit execution to be in any required sequential ordering, concurrent ordering or not activated at all.

As described above, the preferred embodiments according to the present invention implement efficient function or work scheduling in a generalized architecture (e.g., a processor architecture), and in particular, for highly configurable architectures (e.g., a processor architecture in which new instructions and hardware can be added). Further, the preferred embodiments of the self-timed scheduler according to the present invention can simplify the control structures for digital processors. In addition, the user programmable structure of the decode information, permits run-time definition of instructions and a completely hardware programmable architecture. The preferred embodiments according to the present invention use self-timing and inter-block communication to implement the preferred embodiments of the apparatus and method for control of asynchronous systems.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A data processing apparatus, comprising:
   a plurality of functional units, each functional unit performing a set of prescribed operations;
   a programmable circuit that is capable of modifying an entire instruction;
   a controller that decodes a current entire instruction to perform a corresponding instruction task using the plurality of functional units, wherein an asynchronous control structure implements the current instruction using self-timing initiation by request signals and self-timing completion by acknowledgment signals to control execution of a subset of the functional units according to the functional unit schedule to perform the corresponding instruction task; and
   a communications device coupling the functional units, the programmable circuit and the controller.

2. The data processing apparatus of claim 1, wherein the programmable circuit modifies an entire instruction set.

3. The data processing apparatus of claim 1, wherein the instruction is modified real-time.

4. The data processing apparatus of claim 1, wherein the programmable circuit selects one of a plurality of instructions sets and loads the selected instruction set during initialization of the data processing apparatus.

5. The data processing apparatus of claim 1, wherein the programmable circuit implements an application specific instruction set on a predefined subset of the plurality of functional units.

6. The data processing apparatus of claim 1, wherein the programmable circuit includes a decode programmable memory.

7. The data processing apparatus of claim 6, wherein the programmable circuit is modified by a source external to the data processing apparatus, and wherein the data processing apparatus is implemented on a single semiconductor chip.

8. The data processing apparatus of claim 6, wherein the programmable circuit is user modified.

9. The data processing apparatus of claim 6, wherein the decode programmable memory is RAM.

10. The data processing apparatus of claim 1, wherein the programmable circuit includes an array of registers that are at least one of user modified and modified by a source external to the data processing apparatus.

11. The data processing apparatus of claim 1, wherein the controller executes the entire current instruction by generating functional unit schedule and control information that causes each of the plurality of functional units to be one of bypassed, operated concurrently with other of the plurality of functional units and operated sequentially after said other of the plurality of functional units.

12. The data processing apparatus of claim 11, wherein the current instruction is the modified instruction.

13. The data processing apparatus of claim 1, wherein the controller executes the corresponding instruction task by decoding the current entire instruction and implementing an ordered operation on the subset of the plurality of functional units.

14. The data processing apparatus of claim 13, wherein the ordered operation of the subset of the plurality of functional units is variable.

15. The data processing apparatus of claim 1, wherein the plurality of functional units includes at least one of a program counter unit, an instruction decoder unit, an arithmetic and logic unit, a multiplier unit, an indirect address register unit and a data storage unit, and wherein the controller uses a three-stage instruction pipeline and a four phase communication protocol, and wherein the communications device is a data bus.

16. A data processing apparatus, comprising:
   a plurality of functional units, each functional unit performing a set of prescribed operations;
   a programmable circuit that is capable of modifying an instruction;
   a controller that decodes a plurality of instructions each generating a corresponding functional unit schedule and functional unit control information to perform a corresponding instruction task using the plurality of functional units, wherein the scheduler controller executes first and second instructions of the plurality of instructions by implementing a series operation of a subset of the plurality of functional units according to the corresponding functional unit schedule and control information using self-timed handshake signals, wherein the handshake signals include a self-timing request signal and a self-timing acknowledgment signal, wherein an execution time of the first instruction is different from an execution time of the second instruction to perform the corresponding instruction task; and
   a communications device coupling the functional units, the programmable circuit and the controller.

17. The data processing apparatus of claim 16, wherein the programmable circuit modifies an entire instruction set.

18. The data processing apparatus of claim 16, wherein the first instruction is modified real-time.

19. The data processing apparatus of claim 16, wherein the programmable circuit selects one of a plurality of instructions sets and loads the selected instruction set during initialization of the data processing unit, and wherein the controller implements the selected instruction set on a predefined subset of the plurality of functional units.

20. The data processing apparatus of claim 16, wherein the programmable circuit includes a decode programmable memory implemented using at least one of RAM, ROM and an array of registers.

21. A method of operating a data processing apparatus having a plurality of functional units coupled by a communications device, wherein each of the plurality of functional units perform a set of prescribed operations, the method comprising:
   initializing the data processing apparatus, wherein during initialization decode instruction information is loaded from a programmable unit;
   modifying at least one entire instruction of the decode instruction information;
   decoding an instruction from a prescribed instruction set to generate a functional unit schedule and control information; and
   executing the decoded instruction using the functional unit schedule and the control information, wherein the executing step further comprises self-timing each operation period of the data processing apparatus so that sequential combinations of the functional units achieve differing time-length operation periods when implementing the instruction set.

22. The method of claim 21, further comprising executing a current instruction on a subset of the plurality of functional units, and wherein the initializing step selects one of a plurality of instructions sets included in the decode instruction information.

23. The method of claim 22, further comprising loading the decode instruction information into the programmable unit, wherein the current instruction is modified real-time and wherein the programmable unit is at least one of RAM and a register array.

24. The method of claim 21, wherein the modified instruction is at least one of user modified and modified by a source external to the data processing apparatus.

25. The method of claim 21, wherein the executing step further comprises asynchronously controlling variable execution times in the functional unit schedule.

26. The method of claim 21, wherein the decoding step further comprises causing each of the plurality of functional units to be one of bypassed, operated concurrently with other of the plurality of functional units and operated sequentially after said other of the plurality of functional units.

27. A method of operating a data processing apparatus having a plurality of functional units coupled by a communications device, wherein each of the plurality of functional units perform a set prescribed operations, the method comprising:

initializing the data processing apparatus, wherein during initialization decode instruction information is loaded from a programmable unit; and modifying at least one entire instruction of the decode instruction information;

decoding a first instruction of the decode instruction information to generate a functional unit schedule and control information; and asynchronously controlling variable execution times and using a subset of the plurality of functional units to execute the first instruction, wherein an asynchronous control structure implements the first instruction using self-timing initiation be requesting and completion signals as acknowledgment to control execution of a subset of the plurality of functional units according to the functional unit schedule.

28. The method of claim 27, further comprising loading the decode instruction information into the programmable unit, wherein the instruction is modified real-time and wherein the programmable unit is at least one of RAM and a register array.

* * * * *